April 10, 1956 M. B. OBERTO 2,741,065
ANIMAL TRAP
Filed May 29, 1953 2 Sheets-Sheet 1
Fig. 1
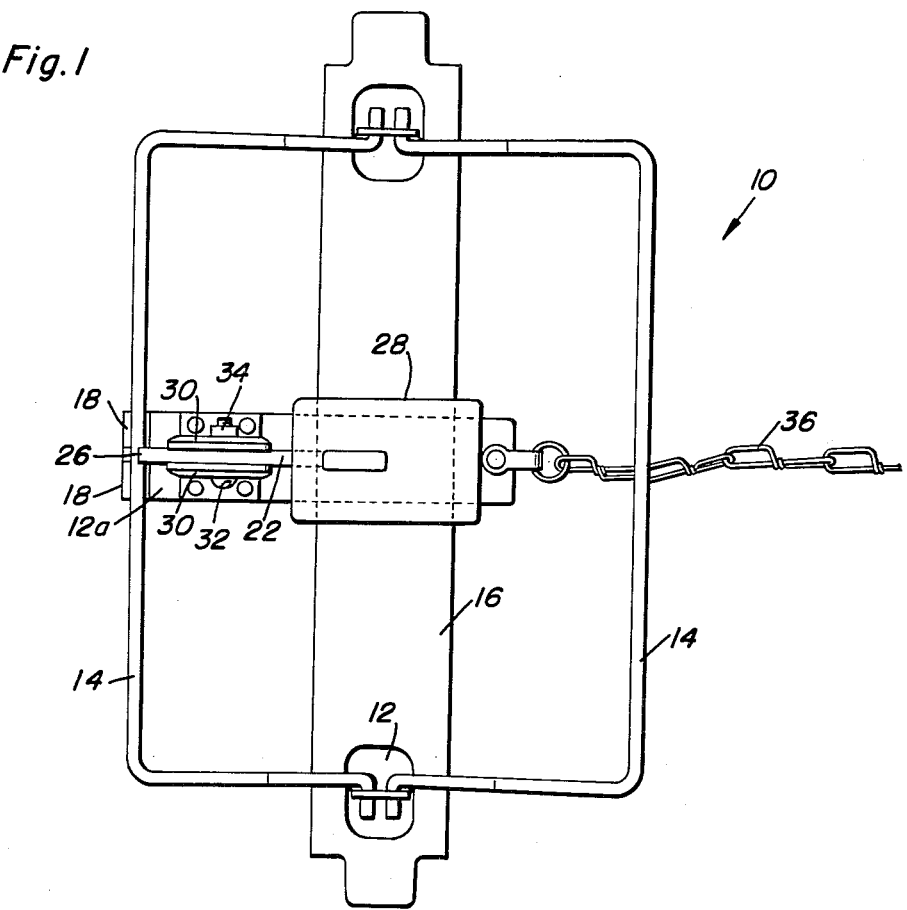
Fig. 2
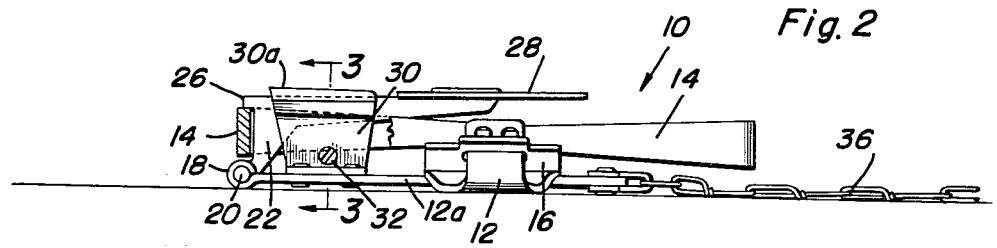
Fig. 3
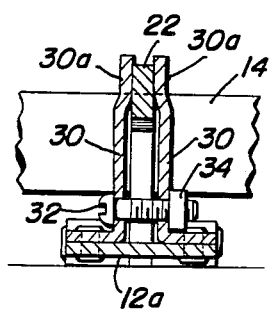
Fig. 4
Morse B. Oberto
INVENTOR.
BY
Attorneys April 10, 1956 M. B. OBERTO 2,741,065
ANIMAL TRAP
Filed May 29, 1953 2 Sheets-Sheet 2

Morse B. Oberto
INVENTOR.

BY *Clarence A. O'Brien
and Harvey B. Jacobson*
Attorneys

United States Patent Office 2,741,065
Patented Apr. 10, 1956

2,741,065

ANIMAL TRAP

Morse B. Oberto, Iron Belt, Wis.

Application May 29, 1953, Serial No. 358,487

3 Claims. (Cl. 43—93)

The present invention relates to an animal trap and is a continuation-in-part of my co-pending application Serial No. 329,614, filed January 5, 1953, and abandoned applications Serial Nos. 265,932 and 276,923, filed on January 11, 1952, and March 17, 1952, respectively.

The primary object of the invention is to provide a trap with an operating mechanism that does not "throw" the animal's paw out of reach of the jaws of the trap which occasionally occurs when the animal steps on the customary trigger or trigger pan of a conventional trap.

Another object of the invention is to provide a trigger mechanism for an animal trap which includes an adjusting means to change or vary the amount of pressure that must be exerted on the actuating mechanism to spring the trap jaws whereby the pan may be readily adjusted for precision release by animals of different weights.

Still another feature of the invention resides in the provision of a mechanism as set forth in the preceding object which is disposed entirely between the open trap jaws so that it does not tend to "throw" the animal's paw out of reach of the jaws when the jaws spring together.

A most important feature of the invention resides in the construction of a trap wherein the inside jaw spread and the pan size are correlated in such a manner that the trap will be actuated by larger game animals and is difficult to actuate by smaller worthless animals or birds.

Conversely, it is an object of the invention to provide a trap construction wherein the inside jaw spread and the trap pan size are correlated to trap the smaller game animals.

Still another feature of the present invention resides in the provision of an animal trap which is extremely easy to set on any type of soil, whether hard or soft.

These, together with various ancillary objects and features which will later become apparent as the following description proceeds are attained by the present invention, a preferred embodiment of which is shown by way of example only in the accompanying drawings wherein:

Figure 1 is a top plan view of the invention;

Figure 2 is a side elevational view of the invention, with parts being broken away for clarity of detail;

Figure 3 is a sectional detail view taken substantially in the plane of section line 3—3 of Figure 2;

Figure 4 is a perspective view of the locking member and pan used in the present invention;

Figure 5:
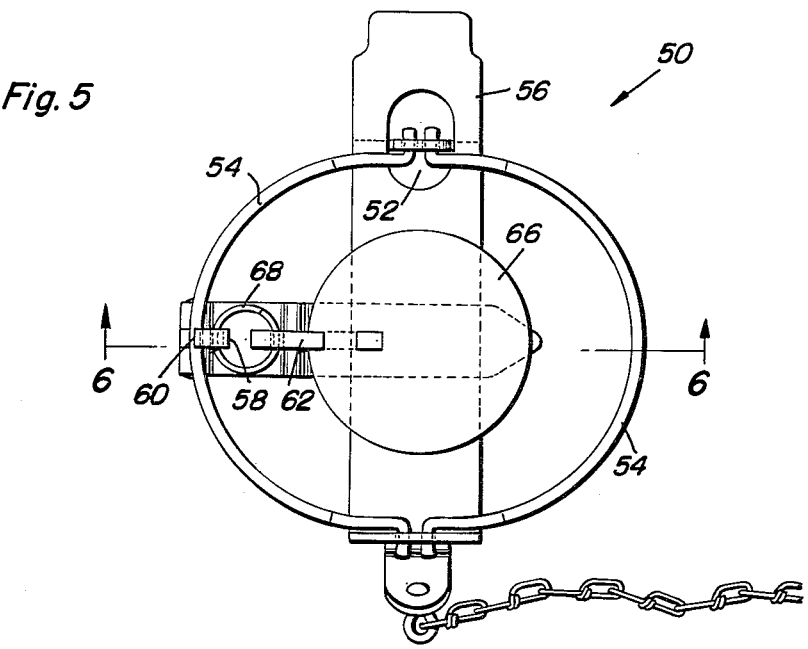
Figure 5 is a top plan view of a modified form of the invention.

Referring now to Figures 1-4 inclusive, the animal trap is designated 10. The trap 10 is of a conventional nature in that it comprises the customary base 12 on which are pivotally mounted a pair of coacting jaws 14, which jaws are constantly urged to a closed position by means of a strong leaf spring 16.

The base 12 is provided at one side thereof with a lateral extension 12a terminating in tubular bearings 18, the latter being provided with a fulcrum pin 20 on which is mounted a locking member or arm 22.

Noting Figures 2 and 4, it will be seen that the locking member 22 is provided with an apertured depending portion 24 to accommodate the fulcrum pin 20. This depending portion 24 constitutes the outer end of the locking arm 22 and mounts the locking arm 22 on the lateral extension 12a in such a manner that the arm is disposed substantially within the jaw spread of the jaws 14 when the jaws are in open position.

An outwardly projecting detent on the outer end 24 of the arm 22 is illustrated by the numeral 26 and engages in overlapping relation one of the jaws 14 in order to sustain the jaws in open position against the resiliency of the leaf spring 16.

A small pan 28 is mounted on the inner end of the arm 22 so that it is disposed centrally between the jaws 14 and immediately above the central portion of the leaf spring 16 so that when the trap is set as shown in Figure 1 and an animal steps with its paw on the pan 28, the locking member or arm 22 will be swung downwardly about the pivot pin 20 and the detent 26 will be disengaged from the associated jaw 14, thus permitting the two jaws to be swung together by the actuation of the spring 16.

This movement of the locking arm 22 assures the quiet operation of the trap during the release of the jaws from their open position. Moreover, since the locking arm directly engages one of the jaws the releasing mechanism of the trap does not "throw" the animal's paw upwardly and outwardly from the closing jaws.

A pair of transversely spaced angle brackets 30 are secured to an intermediate portion of the base extension 12a and have inturned, opposing upper portions 30a which frictionally engage an intermediate portion of the locking arm 22 to retain the same against pivoting movement about its outer end portion 24. A screw 32 is provided with a nut 34, the screw extending through and between the brackets 30 with the nut 34 drawing the brackets toward one another whereby the frictional engagement of the bracket portions 30a with the locking arm 22 may be varied in order to adjust the downward pressure on the pan that is required for releasing the jaws of the trap. It will be noted from Figure 3 that nut 34 is non-rotatably but removably mounted for screw driver operation of the screw 32.

The bracket portions 30a project above the upper edge of the locking arm 22 and thereby prevent this arm from being prematurely depressed, in other words prior to such time as the animal's paw is in proper position over the pan 28. Also, when the screw 32 is tightened, the frictional engagement of the bracket portions 30a with the locking member 22 is such that the detent 26 of the locking member stabilizes the associated trap jaw and thereby prevents the trap from being sprung if the animal should step on that jaw at either side of the detent 26.

Moreover, it is to be noted that by tightening the screw 32, the frictional engagement of the inwardly offset bracket portions 30a with the locking member 22 may be increased so that the arm 22 is sufficiently "tight" against release and yet which has a comparatively loose action once the pan 28 is depressed. Thus, the trap may be readily adjusted for precision release by animals of different weights, but once the pan is slightly depressed and the locking member 22 is released from the frictional grip of the bracket portions 30a the animal's paw drops suddenly and unexpectedly into the trap. Thus the trap jaws grip the animal well above the large pad of the animal's paw while the animal is still off guard and off balance.

To set the trap, press down spring 16, open the trap jaws 14 and press one of these jaws down against the extension 12a; then, hold the trap in an upsidedown position so that the locking arm 22 falls between the offset bracket portions 30a; then tighten the screw 32. Thus, the trapper may set the trap without at any time touching the pan and the locking arm 22 between the trap jaws 14.

Turning again to Figure 1, the pan 28 is shown as being of a relatively small area with respect to the total area inside the trap jaws. This is very important in the proper operation of the trap for in essence it gauges the trap to be effectively actuated only by animals having paws within a predetermined size range.

In the present invention, when constructed for example to catch timber wolves, the distance between the edges of the small pan 28 and the inside of the jaws 14 must be such that the paw of the animal cannot simultaneously touch the pan and the jaw but will only touch one or the other; thus, since movement of the pan 28 releases the jaws 14, the animal's paw will have to be disposed completely within the area enclosed by the open jaws before the trap will be actuated and the trap will be almost completely effective.

The distance between the edges of the pan 28 and the inside of the jaws 14 at their pivots must be such that the paw of the animal cannot simultaneously touch the pan 28 and that portion of the unsprung spring 16 at the jaw pivots. This prevents the paw of the animal from simultaneously touching the aforementioned portion of the unsprung spring 16 and the pan 28 and assures the paw of being disposed completely within the aforementioned area enclosed by the open jaws before the trap will be actuated. This prevents "toe holds" to further increase the effectivity of the trap. This is particularly important in the trapping of large game animals since these animals are quite powerful and readily fight the trap when caught. Therefore, if the height of the jaw grip obtained is not well above the large pad of the animal's paw, the animal may twist off portions of the paw and escape.

The sensitivity of the pan 28 and locking member 22 may be varied by mounting the locking member 22 at various positions on the base of the trap. In the embodiment shown in Fig. 2, the locking member 22 is mounted on the lateral extension 12a at 20 directly under the jaw 14.

If the locking member 22 is mounted on the lateral extension 12a inside the jaw 14, the sensitivity of the pan and locking member will be increased.

Conversely, if the locking member 22 is mounted on the lateral extension 12a outside of the jaw 14, the sensitivity of the pan 28 and locking member will be decreased.

Thus, when the proper sensitivity of the pan and locking member is employed, the trap will be readily actuated.

Obviously, the length of the detent 26 may also be utilized to time the trap. By extending the detent 26, there will be a prolonged sinking of the pan 28 before closing of the trap jaws whereas with a short detent 26, the sinking distance of the pan 28 will be considerably decreased to actuate the jaws.

Therefore, to properly time the trap, the detent must be of such length that the trap will be actuated only when the pan is depressed below the level line of the open jaws 14 whereby the jaw grip obtained will be well above the large pad of the animal's paw.

It is to be noted that the customary anchor chain 36 may be secured to the base extension 12a in the trap as shown.

Figure 6:
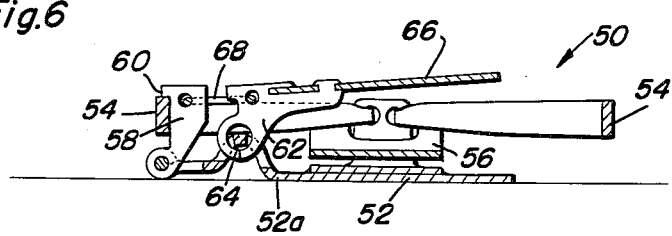
Figure 6 is a sectional view, taken substantially in the plane of the section line 6—6 of Figure 5.
Figure 7:
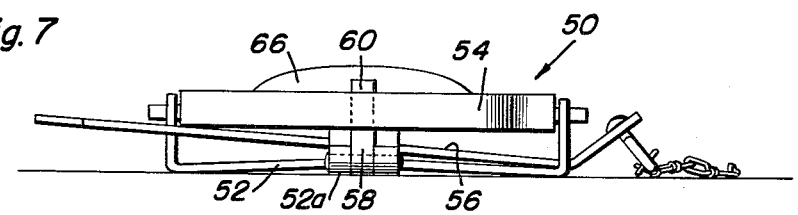
Figure 7 is an elevational view of the device shown in Figures 5 and 6.
Figure 8:
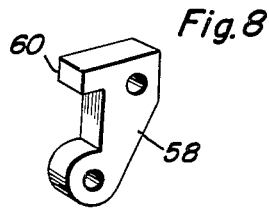
Figure 8 is a perspective view of the locking member used in the modified trap shown in Figures 5-7.

Referring now to Figures 5–8 inclusive, wherein a modified form of the trap is designated by the reference character 50, it will be noted that the modified trap 50 includes a base 52 having an extension 52a, a pair of coacting jaws 54 mounted on the base 52 and urged to a closed position by spring 56. A relatively small locking member 58 is pivoted to the base extension 52a and is provided with a detent 60 to engage one of the jaws.

A release arm 62 is pivoted to the base extension 52a at 64 and carries a depressible pan 66, which as shown is of a comparatively large size with respect to the area enclosed between the jaws 54. With this construction smaller game animals will almost invariably be caught in the trap when they step inside the jaw spread by virtue of the large pan area. An eye or link 68 operatively connects the arm 62 to the locking member 58 so that the detent 60 is released from the associated jaw when the pan 66 is depressed.

The operation of this ambodiment of the invention is similar to that already described, and again it will be noted that the pan 66, arm 62, link 68 and the locking member or arm 58 are disposed entirely between the jaws 54 when the latter are opened, so that the trap actuating mechanism does not throw the animal out of reach of the closing jaws.

Since in the present invention the inside jaw spread and pan size are correlated with the size of the paw of the animal to be trapped in such a manner that the animal cannot simultaneously touch the pan and jaws or the pan and that portion of the spring adjacent the pivots of the jaws, therefore the animal's paw must be disposed completely within the area encompassed by the open jaws before the trap will be actuated.

Since numerous modifications and changes will readily occur to those skilled in the art after a perusal of the foregoing specification taken in conjunction with the accompanying drawings, it is not desired to limit the invention to the exact construction shown and described. All suitable modifications may be resorted to which fall within the scope of the appended claims.

What is claimed as new is as follows:

1. In an animal trap, a base, a pair of coacting jaws swingably mounted on said base, resilient means biasing said jaws to closed position, a locking member pivoted adjacent one end to said base remote from the swingable mounting of the jaws, a detent on said locking member and overlying one of the jaws for sustaining the jaws in open position, a depressible pan operatively connected to said locking member at the end remote from said one end, means on said base adjustably engaging said locking member for controlling the pan pressure necessary to depress the pan and release the locking detent, said means including a pair of spaced upstanding brackets on said base, the upper end portions of said brackets being laterally, inwardly offset toward one another, said locking member fitting between said upper end portions, and means for drawing said upper end portions into varying degrees of frictional engagement with said locking member to control the amount of pressure initially necessary to depress the pan and to release the locking member from frictional engagement for substantially free falling movement of the pan after its initial depression.

2. In an animal trap, a base, a pair of coacting jaws swingably mounted on said base, resilient means biasing said jaws to closed position, a locking member pivoted adjacent one end to said base remote from the swingable mounting of the jaws, a detent on said locking member and overlying one of the jaws for sustaining the jaws in open position, a depressible pan operatively connected to said locking member at the end remote from said one end, means on said base adjustably engaging said locking member for controlling the pan pressure necessary to depress the pan and release the locking detent, said means including a pair of spaced upstanding brackets on said base, the upper end portions of said brackets being laterally, inwardly offset toward one another, said locking member fitting between said upper end portions, and means for drawing said upper end portions into varying degrees of frictional engagement with said locking member to control the amount of pressure initially necessary to depress the pan and to release the locking member from frictional engagement for substantially free falling movement of the pan after its initial depression, the upper ends of said brackets projecting above said locking member for protecting the same from inadvertent depression.

3. An animal trap comprising a base, a pair of coacting jaws swingably mounted on said base, resilient means for closing said jaws, and means for releasably locking said jaws in open position, said means including a pan disposed centrally of said jaws when said jaws are in open position, the inner periphery of said jaws being spaced from the marginal edge of said pan a predetermined distance and providing a space therebetween of greater area than the average paw size of an animal to be trapped, said means including a locking arm pivoted at one end to said base at a point remote from the swingable mounting of the jaws, a detent on said one end engaging one of the jaws for sustaining the jaws in open position; said pan being mounted on the other end of said arm, depression of said pan swinging said arm downwardly releasing said jaws, and adjustable means attached to said base and engaging said arm for varying the initial pan pressure necessary to swing said arm, said means comprising a pair of side-by-side spaced brackets on said base having inwardly offset upper end portions, said locking member extending between and being frictionally engageable by said upper end portions, whereby after the initial depression of the pan the locking member is released from the adjustable means for free falling movement.

References Cited in the file of this patent
UNITED STATES PATENTS

| | | |
|---|---|---|
| 334,311 | Vasseur | Jan. 12, 1886 |
| 786,145 | Parsons | Mar. 28, 1905 |
| 860,639 | Crago | July 23, 1907 |
| 1,531,021 | Palmer | Mar. 24, 1925 |